United States Patent [19]

Cook et al.

[11] Patent Number: 5,708,338
[45] Date of Patent: Jan. 13, 1998

[54] SYSTEM AND METHOD FOR CONTROLLING VEHICLE SLIDING DOOR

[75] Inventors: Roger Joseph Cook, Livonia; Alan Kline Jeffery, Ann Arbor; Hassan Arghavani-Badrabadi, West Bloomfield; Raymond Jack Mohr, Sterling Heights; Clifford David Altemare, Jr., Dearborn, all of Mich.

[73] Assignee: Ford Motor Company, Dearborn, Mich.

[21] Appl. No.: 552,640

[22] Filed: Nov. 3, 1995

[51] Int. Cl.$^6$ .................................................. H02C 3/20
[52] U.S. Cl. .................... 318/466; 318/468; 318/286; 318/603
[58] Field of Search ........................ 318/466, 470, 318/445–450, 452–458, 461, 560–567, 478, 603, 280–292; 49/138–139, 280, 360

[56] References Cited

U.S. PATENT DOCUMENTS

| | | | |
|---|---|---|---|
| 3,069,151 | 12/1962 | Cook et al. | 268/3 |
| 3,124,344 | 3/1964 | Mano | 268/3 |
| 3,141,662 | 7/1964 | Wise | 268/3 |
| 3,202,414 | 8/1965 | Simmons et al. | 268/3 |
| 3,398,484 | 8/1968 | Katsumura et al. | 49/138 |
| 3,893,260 | 7/1975 | Cadiou | 49/362 |
| 4,121,382 | 10/1978 | Dietrich et al. | 49/334 |
| 4,183,177 | 1/1980 | Kurdziel | 49/25 |
| 4,314,692 | 2/1982 | Brauer et al. | 254/362 |
| 4,337,596 | 7/1982 | Kern et al. | 49/210 |
| 4,422,521 | 12/1983 | Mochida | 180/271 |
| 4,462,185 | 7/1984 | Shibuki et al. | 49/218 |
| 4,468,596 | 8/1984 | Kinzl et al. | 318/287 |
| 4,489,640 | 12/1984 | Olson | 91/189 R |
| 4,530,185 | 7/1985 | Moriya et al. | 49/280 |
| 4,546,845 | 10/1985 | Meyer et al. | 180/286 |
| 4,549,369 | 10/1985 | Foley, Jr. | 49/279 |
| 4,608,637 | 8/1986 | Okuyama et al. | 364/424 |
| 4,612,729 | 9/1986 | Sato | 49/362 |
| 4,617,757 | 10/1986 | Kagiyama et al. | 49/280 |
| 4,640,050 | 2/1987 | Yamagishi et al. | 49/280 |
| 4,641,067 | 2/1987 | Iizawa et al. | 318/287 |
| 4,644,692 | 2/1987 | Schindehütte | 49/213 |
| 4,644,693 | 2/1987 | Wang | 49/280 |
| 4,775,178 | 10/1988 | Boyko | 292/341.16 |
| 4,811,013 | 3/1989 | Akutsu | 340/825.31 |
| 4,831,509 | 5/1989 | Jones et al. | 364/167.01 |
| 4,842,313 | 6/1989 | Boyko et al. | 292/341.16 |
| 4,862,640 | 9/1989 | Boyko et al. | 49/213 |
| 4,872,082 | 10/1989 | Martel | 361/179 |
| 4,887,390 | 12/1989 | Boyko et al. | 49/214 |
| 4,935,736 | 6/1990 | Meierdierck | 340/825.69 |
| 4,959,598 | 9/1990 | Yoshida et al. | 318/599 |
| 4,983,963 | 1/1991 | Hodgetts et al. | 340/870.31 |
| 4,984,385 | 1/1991 | Deland | 49/280 |
| 4,994,724 | 2/1991 | Hsu | 318/603 |
| 4,999,551 | 3/1991 | Yoshida et al. | 318/286 |
| 5,018,303 | 5/1991 | Koura et al. | 49/280 |
| 5,039,925 | 8/1991 | Schap | 318/282 |
| 5,062,241 | 11/1991 | DeLand | 49/460 |
| 5,063,710 | 11/1991 | Schap | 49/280 |
| 5,069,000 | 12/1991 | Zuckerman | 49/28 |

(List continued on next page.)

FOREIGN PATENT DOCUMENTS

| | | |
|---|---|---|
| 0017515 | 10/1980 | European Pat. Off. . |
| 0 625 815 A2 | 11/1994 | European Pat. Off. . |
| 2578078 | 8/1986 | France . |
| 3523261 | 1/1986 | Germany . |
| 620336 | 5/1949 | United Kingdom . |

*Primary Examiner*—David S. Martin
*Attorney, Agent, or Firm*—Mark S. Sparschu; Roger L. May

[57] ABSTRACT

A system and method for controlling a vehicle sliding door driven by an electric motor. The method includes generating a periodic signal representing a door position, measuring first and second pluralities of signal periods such that errors in the periodic signal are minimized, comparing the first and second pluralities of signal periods, and generating a motor control signal operative to deactivate the motor when the second plurality of signal periods exceed a selected percentage of the first plurality of signal periods. A system for carrying out the method is also disclosed.

16 Claims, 5 Drawing Sheets

U.S. PATENT DOCUMENTS

| | | | |
|---|---|---|---|
| 5,083,397 | 1/1992 | Koura | 49/28 |
| 5,105,131 | 4/1992 | Schap | 318/282 |
| 5,140,316 | 8/1992 | DeLand et al. | 340/825.69 |
| 5,144,769 | 9/1992 | Koura | 49/360 |
| 5,155,937 | 10/1992 | Yamagishi et al. | 49/280 |
| 5,162,711 | 11/1992 | Heckler | 318/264 |
| 5,189,839 | 3/1993 | DeLand et al. | 49/360 |
| 5,203,112 | 4/1993 | Yamagishi et al. | 49/280 |
| 5,216,838 | 6/1993 | DeLand et al. | 49/280 |
| 5,218,282 | 6/1993 | Duhame | 318/603 |
| 5,228,239 | 7/1993 | Heo | 49/280 |
| 5,239,779 | 8/1993 | DeLand et al. | 49/360 |
| 5,263,762 | 11/1993 | Long et al. | 296/146.4 |
| 5,315,220 | 5/1994 | Takimoto et al. | 318/282 |
| 5,316,365 | 5/1994 | Kuhlman et al. | 296/155 |
| 5,319,880 | 6/1994 | Kuhlman | 49/360 |
| 5,319,881 | 6/1994 | Kuhlman | 49/360 |
| 5,350,986 | 9/1994 | Long et al. | 318/432 |
| 5,396,158 | 3/1995 | Long et al. | 318/282 |

SYSTEM AND METHOD FOR CONTROLLING VEHICLE SLIDING DOOR

TECHNICAL FIELD

The present invention relates to a system and method for controlling a vehicle sliding door driven by an electric motor.

BACKGROUND ART

It has become increasingly popular to automate the opening and closing operations of vehicle sliding doors, such as those found on vans or the like, via an electric drive motor. One example of such a vehicle sliding door control system and method is found in U.S. Pat. No. 5,396,158 issued to Long et al. ("the Long '158 patent").

To help protect vehicle passengers and others from injury during automatic door operations, most systems and methods for controlling vehicle sliding doors include a blockage detection feature, such as the motor stall technique disclosed the Long '158 patent. These blockage detection features, however, are incapable of continuously adapting to changing environmental and vehicle conditions. They can thus provide false indications of blockage, thereby leading to improper door opening or closing operations.

As a result, there is a need for an improved system and method for controlling a vehicle sliding door. Such a system and method would be capable of continuously adapting to changing environmental and vehicle conditions. In such a fashion, the system and method would provide for improved accuracy in blockage detection during automatic door opening and closing operations.

DISCLOSURE OF INVENTION

Accordingly, it is the principal object of the present invention to provide an improved system and method for controlling a vehicle sliding door driven by an electric motor.

According to the present invention, a method for controlling a vehicle sliding door driven by an electric motor powered by a battery is disclosed. The method comprises generating a periodic signal representing a door position, and measuring a first plurality of signal periods and a second plurality of signal periods such that errors in the periodic signal are minimized. The method further comprises comparing the first plurality of signal periods to the second plurality of signal periods, and generating a motor control signal operative to deactivate the motor when the second plurality of signal periods exceeds a selected percentage of the first plurality of signal periods.

A system for controlling a vehicle sliding door driven by an electric motor powered by a battery is also disclosed. The system comprises means for generating a periodic signal representing a door position, and means for measuring a first plurality of signal periods and a second plurality of signal periods such that errors in the periodic signal are minimized. The system further comprises means for comparing the first plurality of signal periods to the second plurality of signal periods, and means for generating a motor control signal operative to deactivate the motor when the second plurality of signal periods exceeds a selected percentage of the first plurality of signal periods.

These and other objects, features and advantages will be readily apparent upon consideration of the following detailed description in conjunction with the accompanying drawings.

BEST MODE FOR CARRYING OUT THE INVENTION

Vehicle sliding door systems vary widely in regard to the force required to close the door. Variables like motor torque, battery voltage, ambient temperature, track friction, system geometry and tolerances, and vehicle inclination all affect how much effort must be applied to close the door. The present invention provides a system and method for determining the ease or difficulty with which the door moves, and for adjusting the motor current to match the system performance required.

Figure 1:
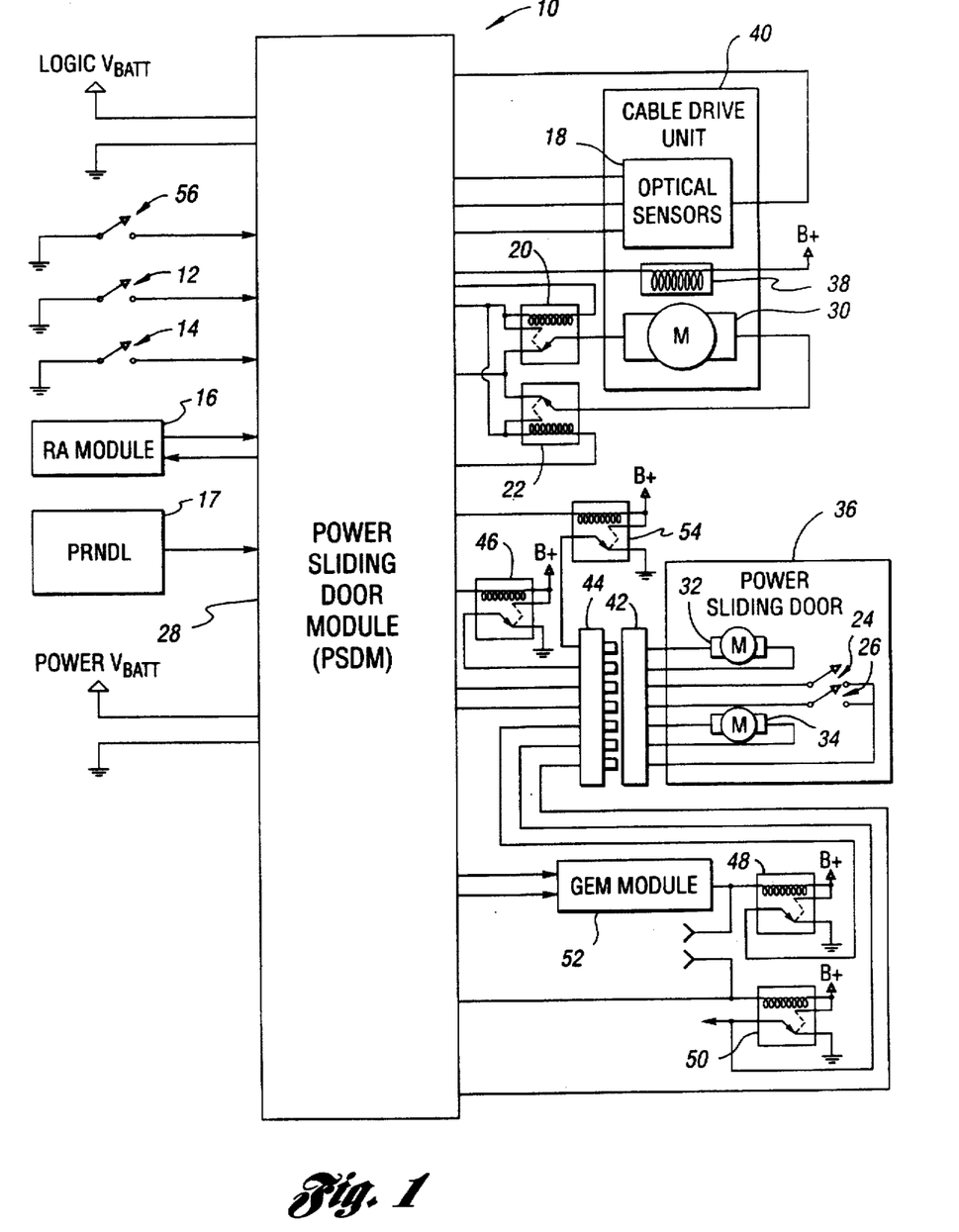
FIG. 1 is a simplified schematic of the vehicle sliding door control system of the present invention.

Referring first to FIG. 1, a simplified schematic of the vehicle sliding door system of the present invention is shown, denoted generally by reference numeral 10. In general, system (10) provides for automatic electronic control of a vehicle sliding door. Input signals from an operator (12, 16, 17), a door position encoder (18), and various switching devices (20, 22, 24, 26) are processed by a control module (28) to generate output signals for controlling electric motors (30, 32, 34) that open and close the vehicle door (36) under a variety of conditions. In that regard, control module (28) is provided with an algorithm for carrying out the method of the present invention.

Driver (12), passenger (14), and remote access (16) switching devices may be used by an operator to generate an input signal to open or close the vehicle door (36). Three motors, including a door drive motor (30) mounted in the vehicle body, and door latch (32) and lock (34) motors mounted in the vehicle door (36), are provided to open or close the door in response to output signals generated by the control module (28). The door drive motor (30) is operated in conjunction with a clutch mechanism (38).

In response to an operator input signal commanding that a fully open door be closed, as well as an input signal from PRNDL unit (17) indicating that the vehicle is in PARK, control module (28) first activates a close relay (22), and then activates a solid-state switch (not shown) therein such that the door drive motor (30) is energized with the polarity required to drive the door (36) toward the fully closed position. A cable drive unit (40) including a drum and cable (not shown) moves the door (36) in response to energization of the door drive motor (30). As will be described in greater detail below, because there is ample time to react to an obstruction in the door path, the drive motor (30) is operated at a 100% duty cycle.

As the door (36) moves toward the fully closed position, position encoder (18), preferably a dual channel quadrature output optical sensor, generates pulsed input signals representing door position. These signals are filled with errors of phase jitter, symmetry and noise. The system (10) and method of the present invention are designed to minimize these errors with the use of 4 and 16 sample size buffers that are updated and compared for relative size. These samples consist of ticks in a counter (not shown) inside control module (28) that are accumulated between successive signal edges from position encoder (18). The newest sample in each buffer always replaces the last correspondingly phased buffer entry, such that each buffer is a "rolling" buffer. Via this sampling technique, door blockage detection is accomplished from unexpectedly large differences between the contents of two buffers over very short door travel distances.

Each time the door drive motor (30) moves the door (36) toward fully closed position at a 100% duty cycle, the control module (28) uses the pulsed input signals from the position encoder (18) prior to a selected door position to characterize a number of door operating parameters. More particularly, the input signal pulses have a known relationship to the rotation of the drive motor (30). Given the duty cycle of the motor (30), the timing between input signals and the order in which they are received by the control module (28) are indicative of door position, direction of travel, speed, and force. The pulsed input signals are further indicative of such parameters as vehicle incline, temperature, motor strength, track stiffness, and weather seal tightness.

The system (10) and method of the present invention use such characterizations, together with a sensed voltage of the vehicle battery (not shown), to modulate the percentage by which the 100% duty cycle of the door drive motor (30) will be reduced as the door reaches selected positions and regions during door opening or closing operations. That is, different percentage reductions in the door drive motor duty cycle will result depending on initial door speed and battery voltage. Door speed at the 100% duty cycle is made relative to the battery voltage so that if battery voltage changes, an adjustment can be made such that the closing force imparted to the door (36) by drive motor (30) remains constant within each selected region.

More specifically, during door closing operations, the system (10) and method of the present invention use door speed data outside a door position of 200 mm from fully closed (during a closing operation) to determine the duty cycle of drive motor (30) required when the door (36) is within 200 mm and 25 mm from a fully closed position such that drive motor (30) imparts the proper closing force to door (36). When the door (36) reaches those selected positions, the duty cycle of drive motor (30) is adjusted via pulse width modulated (PWM) signals applied thereto. A look-up table entered from door speed data contains the information necessary to determine the required PWM rate. For example, the duty cycle of drive motor (30) may be adjusted from 100% to 80% at a door position of 200 mm, and from 80% to 60% at a door position of 25 mm.

In such a fashion, an adjustment is made to the average current of drive motor (30), which has a direct relationship to motor torque and door closing effort. While only two selected positions and regions are described, any number of positions and regions may be employed.

The pulsed input signals from the position encoder (18) are also used for obstruction detection. As described in greater detail below, an increase in the expected time interval between input signals is indicative of the force being applied by the motor (28) to the door (36), as well as the force being applied by the door (36) to an obstruction. Given the motor duty cycle, if the interval of a second plurality of pulses exceeds a selected percentage of the interval of a first plurality of pulses, the control module (28) determines that the force imparted by the motor (30) to the door (36) has exceeded a selected force threshold, indicating that the door (36) has encountered an obstruction.

In that event, the control module (28) first de-energizes the door drive motor (30) by deactivating the solid-state switch (not shown) therein. As a result, the door (36) will be forced toward the fully open position to some extent, depending upon the spring force of the particular obstruction encountered. Thereafter, the control module (28) reverses the door drive motor by deactivating the close relay (22), activating an open relay (20), and then reactivating the solid-state switch (not shown) therein such that the motor (30) is energized with the polarity required to drive the door (36) toward its fully open position.

In the event that an obstruction is not encountered, the door drive motor (30) continues to move the door toward the fully closed position at a 100% duty cycle. However, as will be described in further detail below, when the door (36) reaches first and second selected positions increasingly proximate the fully closed position, the amount of force applied by the motor (30) to the door (36) is reduced to provide for more sensitive blockage detection.

In order to accomplish this goal, the speed of the door (36) must be reduced. Thus, when the position encoder (18) indicates that the door (36) has reached the first or second selected positions, the control module (28) reduces the duty cycle of the door drive motor (30) by a preselected percentage via pulse width modulation. In so doing, door speed is decreased to a level sufficient to allow for more sensitive reaction to an obstruction which, again, is described in greater detail below.

In the event that an obstruction still is not encountered, the door drive motor (30) continues to move the door (36) toward the fully closed position at the reduced duty cycle. When the door reaches a third selected position proximate the fully closed position (preferably 4 mm), the door is driven to the fully closed position without detection and reaction to obstructions.

At this door position, complimentary contact assemblies (42, 44) provided on the vehicle door (36) and body engage such that power may be supplied to the latch and lock motors (32, 34) mounted in the vehicle door (36). Immediately thereafter, continued door movement toward the fully closed position by the door drive motor (30) closes a ratchet switch (24) which provides an input signal to the control module (28) indicating that the door (36) is in position such that the latch motor (32) may begin operation.

In response to the ratchet switch input signal, the control module (28) activates a latch relay (46) to energize the latch motor (32) with the polarity required to pull the door (36) toward the fully closed position. To improve the continuity of door movement, the door drive motor (30) and the latch motor (32) operate together for a selected period of time. Thereafter, the door drive motor (30) may be deactivated and the door (36) may be brought to the fully closed and latched position by the latch motor (32) alone. When the door (36) reaches the fully closed and latched position, a pawl switch (26) is closed which provides an input signal to the control module (28) indicating that fact. In response, the control module (28) then de-energizes the latch motor (32) by deactivating latch relay (46). Lock motor (34) may then be activated using lock and unlock relays (48, 50), which are controlled via various inputs, including those from generic electronic module (52).

After the door (36) reaches the third selected position described above, if an obstruction does prevent the door (36)

from reaching the fully closed and latched position, an energized latch motor (32) and/or door drive motor (30) will simply be de-energized after expiration of a general timeout period. In that regard, the control module (28) looks for the input signals from the position encoder (18) and the pawl switch (26). If no such signals are received within the general timeout period, the control module (28) de-energizes either or both of those motors (30, 32) by deactivating the relay (46) or solid-state switch (not shown) therein that had been activated to energize them.

In the event of such a fault, door (36) is free to move and will remain in the position it was in when the fault occurred until the system (10) and method of the present invention are reset by manually closing door (36). Thereafter, automatic door operations may be resumed by activation of any of the door control switching devices (12, 14, 16).

Still referring to FIG. 1, in response to an operator input signal commanding that a fully closed door be opened, as well as an input signal from PRNDL unit (17) indicating that the vehicle is in PARK, the control module (28) activates an unlatch relay (54) to energize the latch motor (32) with the polarity required to unlatch the door (36). At the same time, the control module (28) also activates the open relay (22), and then activates the solid-state switch (not shown) therein such that the door drive motor (30) is energized with the polarity required to drive the door (36) toward its fully open position, thereby opening the ratchet switch (24). Simultaneous operation of the drive and latch motors (30, 32) can help break the door (36) free in icy conditions.

In the absence of a ratchet switch input signal, the control module (28) de-energizes the latch motor (32) by deactivating the unlatch relay (54). Thereafter, door drive motor (30) may be activated at a 100% duty cycle to drive door (36) toward its fully open position.

If, however, ratchet switch (24) fails to open before the expiration of the general timeout period previously mentioned, drive and latch motors (30, 32) are deactivated by control module (28). In the event of such a fault, the door (36) is again free to move and will remain in the position it was in when the fault occurred until the system (10) and method of the present invention are reset by manually closing door (36). Thereafter, automatic door operations may be resumed by activation of any of the door control switching devices (12, 14, 16).

Door movement and obstruction detection during opening operations preferably take place in a fashion similar to that during closing operations. Alternatively, however, obstruction detection may be accomplished via the general timeout period previously described. In that regard, control module (28) de-energizes the door drive motor (30) by deactivating the solid-state switch (not shown) therein if input signals are not received from the position encoder (18) before the expiration of the general timeout period. In the event that an obstruction is not detected, the control module (28) de-energizes the door drive motor (30) by deactivating the solid-state switch (not shown) therein when the position encoder (18) indicates that the door (36) has reached the fully open position.

To hold the door (36) in the fully open position after the door drive motor (30) is de-energized, the track (not shown) in which the door (36) travels is provided with a detent which engages the door (36) when it reaches the fully open position. In such a fashion, the door (36) is prevented from closing under its own weight once it has been driven to the fully open position, such as where the vehicle is parked downhill.

It should be noted that the system (10) and method of the present invention are designed such that the door (36) may be operated in either fully automatic or fully manual modes. When operated manually, the door (36) behaves in a manner similar to any standard sliding door. The system (10) and method of the present invention are also designed to provide for power assisted operation of door (36), whereby automatic operation of door (36) takes over after an operator begins manual operation.

Referring still to FIG. 1, an override switch (56) is also provided so that an operator may disable the power assist feature and/or operator switches (12, 14, 16). Further, if door (36) is moving and the position of override switch (56) changes, automatic door operation will be aborted immediately.

It should also be noted that door position is always calculated and recorded from the pulsed input signals provided by position encoder (18). In order to properly track door position, automatic operation of the door (36) must begin with the door (36) completely closed (i.e., pawl switch (26) closed) so the control module (28) can learn where zero (fully closed) is in terms of pulses seen from position encoder (18). The door position value is always zeroed out every time the door is in the closed position, which is detected from a limit switch input, preferably that of pawl switch (26). A fully open door position is determined from the pulse count of the signal provided by position encoder (18). The system (10) and method of the present invention are designed to always drive the door to the fully open or closed positions unless an error condition is detected. As a result, the system (10) and method can always recover valid door locations if pulsed input signals from position encoder (18) are corrupted or if the vehicle sliding door system geometry changes due to wear or environment.

Finally, to alert passengers and others in close proximity that the door (36) is moving, various audible tones can be generated. Preferably, during automatic door opening, a continuous note is gated on at a 25% duty cycle. During automatic door closing, this same tone is generated until the door (36) reaches a first selected position, preferably the 200 mm position previously described. Thereafter, When the same note is gated on at a 50% duty cycle until the door (36) reaches a second selected position, preferably the 25 mm position previously described. Thereafter, the same note is gated on at 100% duty cycle. Such an increasing duty cycle encourages a sense of urgency as the door (36) approaches the fully closed position. With this technique, passengers and others can be aware of what the door (36) is doing even if they are not actively looking at the door (36).

Figure 2:
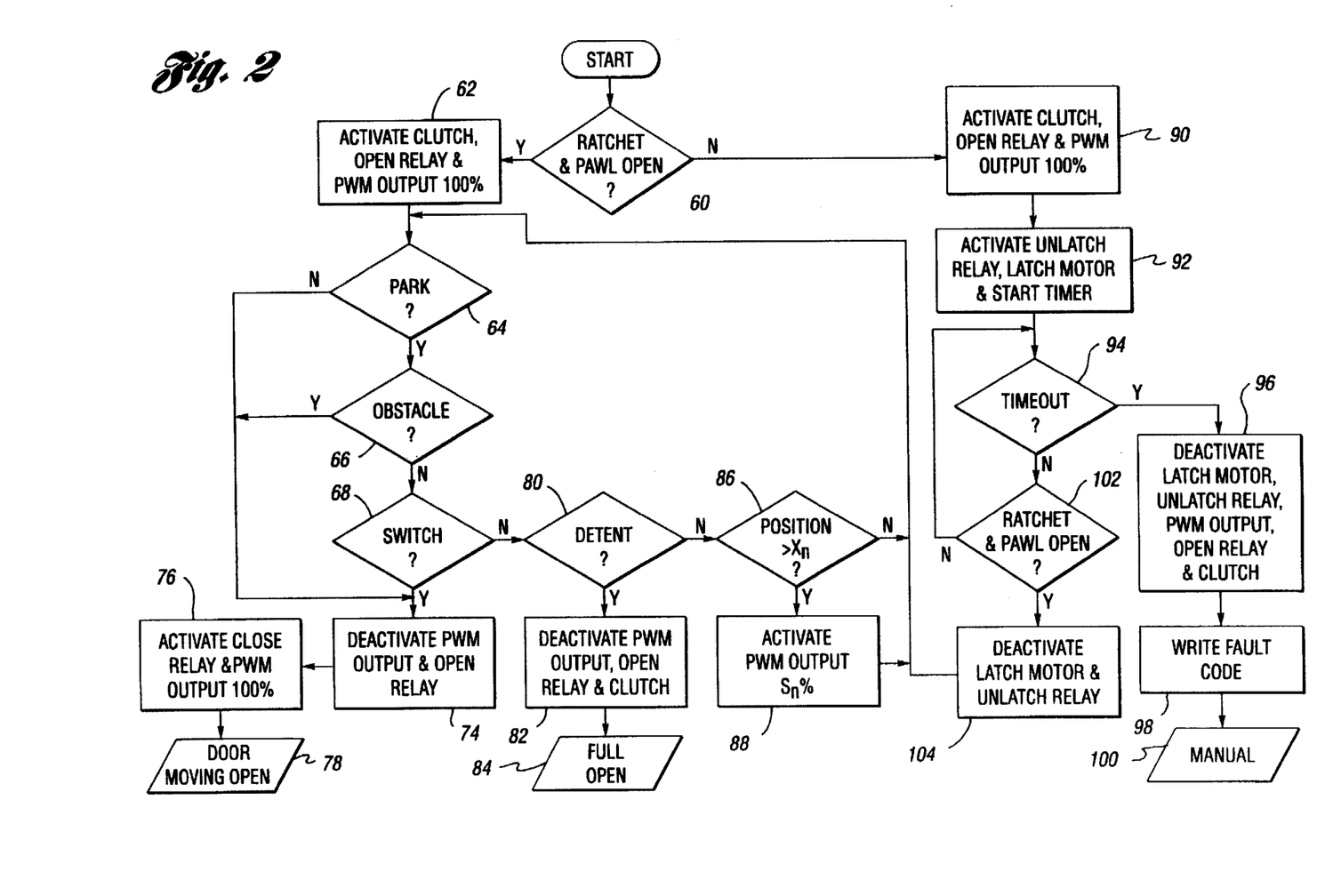
FIG. 2 is a flowchart concerning opening operations for the vehicle sliding door according to the control system and method of the present invention.

Referring next to FIG. 2, a flowchart concerning opening operations for the vehicle sliding door according to the control system (10) and method of the present invention is shown. As seen therein, and with continuing reference to FIG. 1, upon receipt of an input signal from any one of operator switches (12, 14, 16), as well as an input signal from PRNDL unit (17) indicating that the vehicle is in PARK, it is first determined (60) whether both the ratchet and pawl switches (24, 26) are open.

If so, activation (62) of clutch (38), open relay (20), and drive motor (30) at a 100% duty cycle is undertaken. Thereafter, it is determined (64) whether the vehicle remains in PARK. If so, it is then determined (66) whether door (36) has encountered an obstacle. If not, it is then determined (68) whether an additional input signal has been received from any one of operator switches (12, 14, 16).

If the vehicle is no longer in PARK, an obstacle has been detected, or an additional input signal has been received, deactivation (74) of drive motor (30) and open relay (20), and activation (76) of close relay (22) and drive motor (30) at a 100% duty cycle are undertaken. As a result, door (36) transitions to the moving closed state (78).

If the vehicle remains in PARK, no obstacle has been detected, and no additional input signal has been received from operator switches (12, 14, 16), it is then determined (80) whether door (36) has reached the detent in the door track (not shown). If so, deactivation (82) of drive motor (30), open relay (20) and clutch (38) is undertaken as door (36) has reached the fully open state (84).

If door (36) has not reached the detent, it is then determined (86) whether door (36) has reached a first or second selected position. If so, the duty cycle of drive motor (30) is reduced (88) as described above. Thereafter, or if door (36) has not yet reached the first or second selected position, it is again determined (64) whether the vehicle remains in PARK.

If, however, when determining (60) whether both of the ratchet or pawl switches (24, 26) are open, either of those switches are closed, activation (90) of clutch (38), open relay (20) and drive motor (30) at a 100% duty cycle is undertaken. Thereafter, activation (92) of unlatch relay (54), latch motor (32) and the general timeout period is undertaken.

It is then determined (94) whether the general timeout period has expired. If so, deactivation (96) of latch motor (32), unlatch relay (54), drive motor (30), open relay (20) and clutch (38) is undertaken. A fault code is then written (98) and door (36) reverts to manual operation (100).

If the general timeout period has not expired, it is then determined (102) whether both ratchet and pawl switches (24, 26) are now open. If not, it is again determined whether the general timeout period has now expired. However, if both ratchet and pawl switches (24, 26) are open, deactivation (104) of latch motor (32) and unlatch relay (54) is undertaken and it is then determined (64) whether the vehicle remains in PARK.

Figure 3:
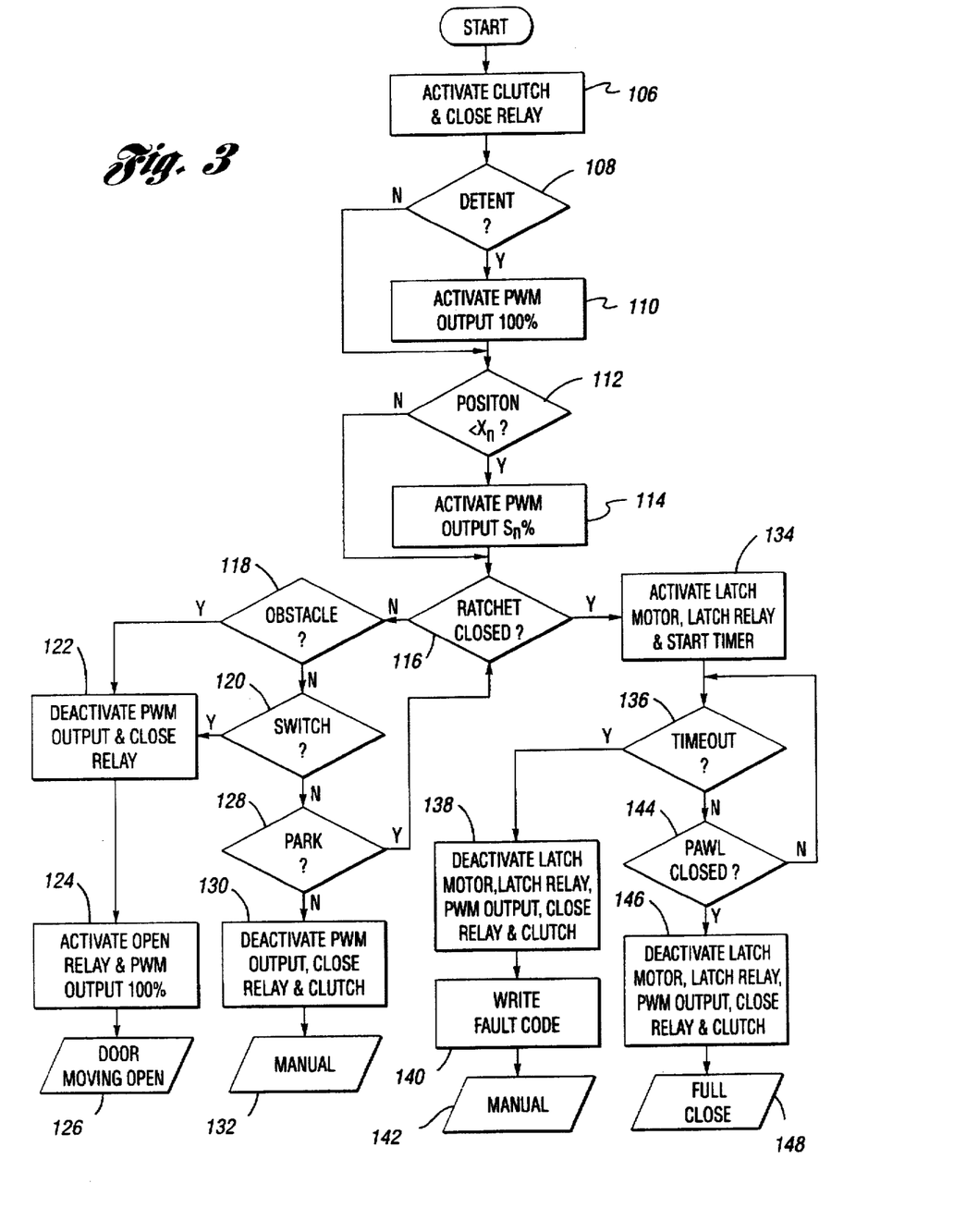
FIG. 3 is a flowchart concerning closing operations for the vehicle sliding door according to the control system and method of the present invention.

Referring next to FIG. 3, a flowchart concerning closing operations for the vehicle sliding door according to the control system (10) and method of the present invention is shown. As seen therein, and with continuing reference to FIG. 1, upon receipt of an input signal from any one of operator switches (12, 14, 16), as well as an input signal from PRNDL unit (17) indicating that the vehicle is in PARK, activation (106) of clutch (38) and close relay (22) is undertaken.

Thereafter, it is determined (108) whether door (36) is located in the detent of the door track (not shown). If so, activation (110) of drive motor (30) may be undertaken at a 100% duty cycle. Thereafter, or if door (36) is not located in the detent, it is determined (112) whether door (36) has reached a first or second selected position.

If so, the duty cycle of drive motor (30) is reduced (114) as described above. Thereafter, or if door (36) has not yet reached first or second selected positions, it is then determined (116) whether ratchet switch (24) is closed.

If not, it is then determined (118) whether door (36) has encountered an obstacle. If not, it is determined (120) whether an additional input signal has been received from any one of operator switches (12, 14, 16). If so, or if door (36) has encountered an obstacle, deactivation (122) of drive motor (30) and close relay (22), and activation (124) of open relay (20) and drive motor (30) at a 100% duty cycle are undertaken. As a result, door (36) transitions to the moving open state (126).

If however, no obstacle is detected and no additional inputs are received from operator switches (12, 14, 16), it is then determined (128) whether the vehicle remains in PARK. If not, deactivation (130) of drive motor (30), close relay (22) and clutch (38) is undertaken and door (36) reverts to manual operation (132).

If, however, the vehicle remains in PARK, it is again determined (116) whether ratchet switch (24) is closed. When that finally occurs, activation (134) of latch relay (46), latch motor (32), and the general timeout period is undertaken.

It is then determined (136) whether the general timeout period has expired. If so, deactivation (138) of latch motor (32), latch relay (46), drive motor (30), close relay (22) and clutch (38) is undertaken. A fault code is then written (140) and door (36) reverts to manual operation (142).

If the general timeout period has not expired, it is then determined (144) whether pawl switch (26) is closed. If not, it is again determined (136) whether the general timeout period has now expired. However, if pawl switch (24) is closed, deactivation (146) of latch motor (32), latch relay (46), drive motor (30), close relay (22) and clutch (38) is undertaken as door (36) has reached the fully closed position (148).

Figure 4:
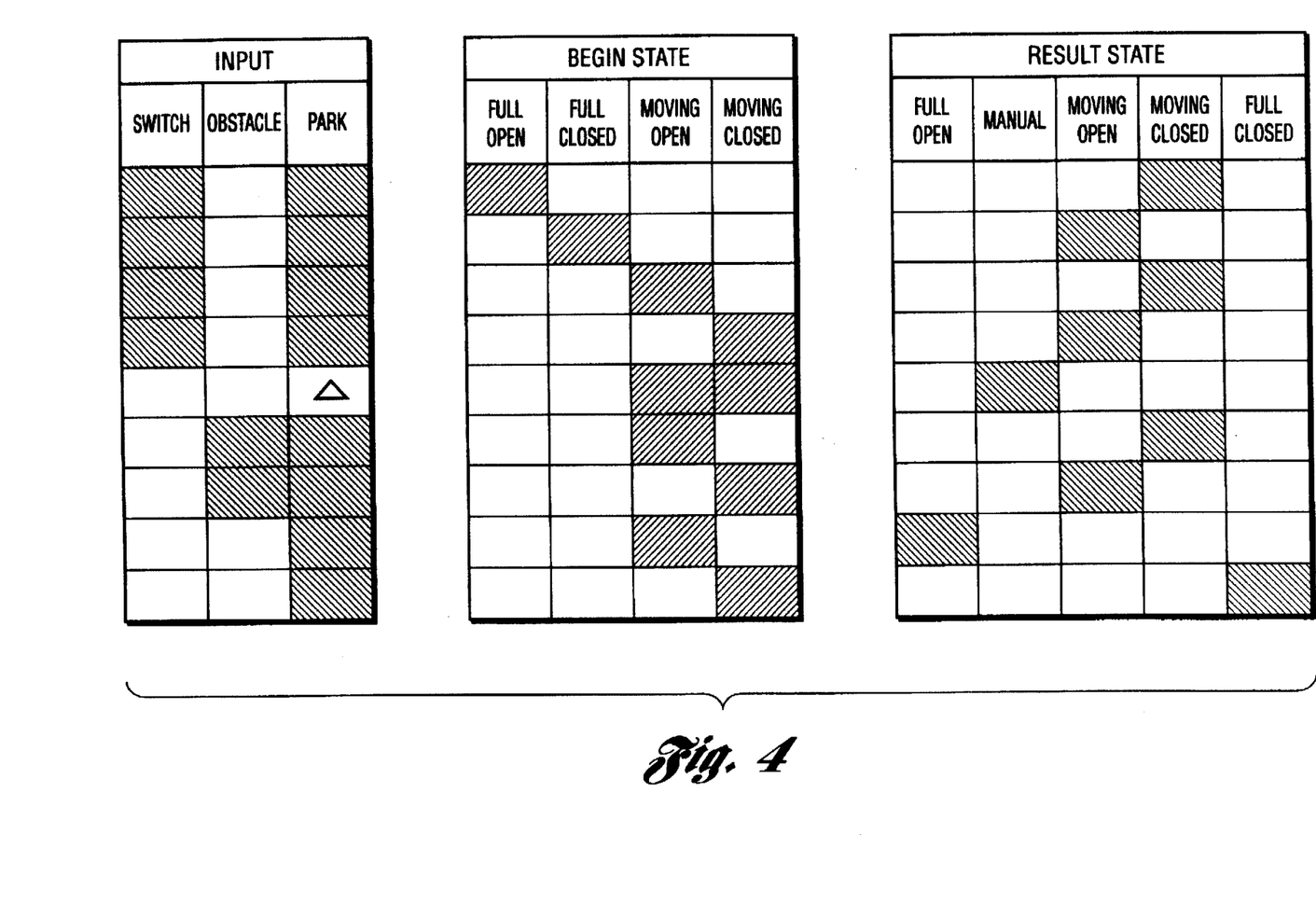
FIG. 4 is a door state diagram for the vehicle sliding door according to the control system and method of the present invention.

Referring next to FIG. 4, a door state diagram for the vehicle sliding door according to the control system (10) and method of the present invention is shown. As seen therein, and with continuing reference to FIG. 1, door (36) may transition between any number of states depending upon the particular input received by control module (28).

In regard to the door states depicted in FIG. 4, fully closed is indicated by the ratchet and pawl switches (24, 26) being closed. The fully open door state is indicated by the contents of the counter (not shown) as well as the control algorithm in control module (28). The door moving open state is defined as door (36) being powered in the open direction, which continues until door (36) reaches the fully open state defined above, or a system input changes the door state. The door moving closed state is defined as door (36) being powered in the closed direction, which continues until door (36) reaches the fully closed position defined above, or a system input changes the system state.

Referring again to FIGS. 1 and 4, if an input signal is received from any one of operator switches (12, 14, 16) when PRNDL unit (17) indicates that the vehicle is in PARK and door (36) is fully open, then door (36) will begin to move closed. Similarly, if an input signal is received from any one of operator switches (12, 14, 16) when PRNDL unit (17) indicates that the vehicle is in PARK and door (36) is fully closed, then door (36) will begin to move open.

If an input signal is received from any one of operator switches (12, 14, 16) when PRNDL unit (17) indicates that the vehicle is in PARK and door (36) is moving open, then door (36) will begin to move closed. Likewise, if an input signal is received from any one of operator switches (12, 14, 16) when PRNDL unit (17) indicates that the vehicle is in PARK and door (36) is moving closed, then door (36) will begin to move open.

If PRNDL unit (17) indicates that the state of the vehicle transmission has changed (delta) from PARK while door (36) is moving open, then door (36) will revert to manual operation. Similarly, if PRNDL unit (17) indicates that the state of the vehicle transmission has changed (delta) from PARK while door (36) is moving closed, door (36) will again revert to manual operation.

Still referring to FIGS. 1 and 4, if an obstacle is detected when PRNDL unit (17) indicates that the vehicle is in PARK and door (36) is moving open, then door (36) will begin to move closed. If an obstacle is detected when PRNDL unit (17) indicates that the vehicle is in PARK and door (36) is moving closed, then door (36) will begin to move open. In that event, the system (10) and method of the present invention will preferably accept input from operator switches (12, 14, 16) after door (36) has moved open at least 150 mm. As long as PRNDL unit (17) indicates that the vehicle is in PARK, door (36) will then begin to move closed.

Finally, where the only input to control module (28) is from PRNDL unit (17) indicating the vehicle is in PARK and door (36) is moving open, door (36) will ultimately reach its fully open position. Likewise, where the only input to control module (28) is from PRNDL unit (17) indicating the vehicle is in PARK and door (36) is moving closed, door (36) will ultimately reach its fully closed position. It can thus be seen from the foregoing that the system (10) and method of the present invention include an interlock such that they will not function if the vehicle is not in PARK.

Figure 5:
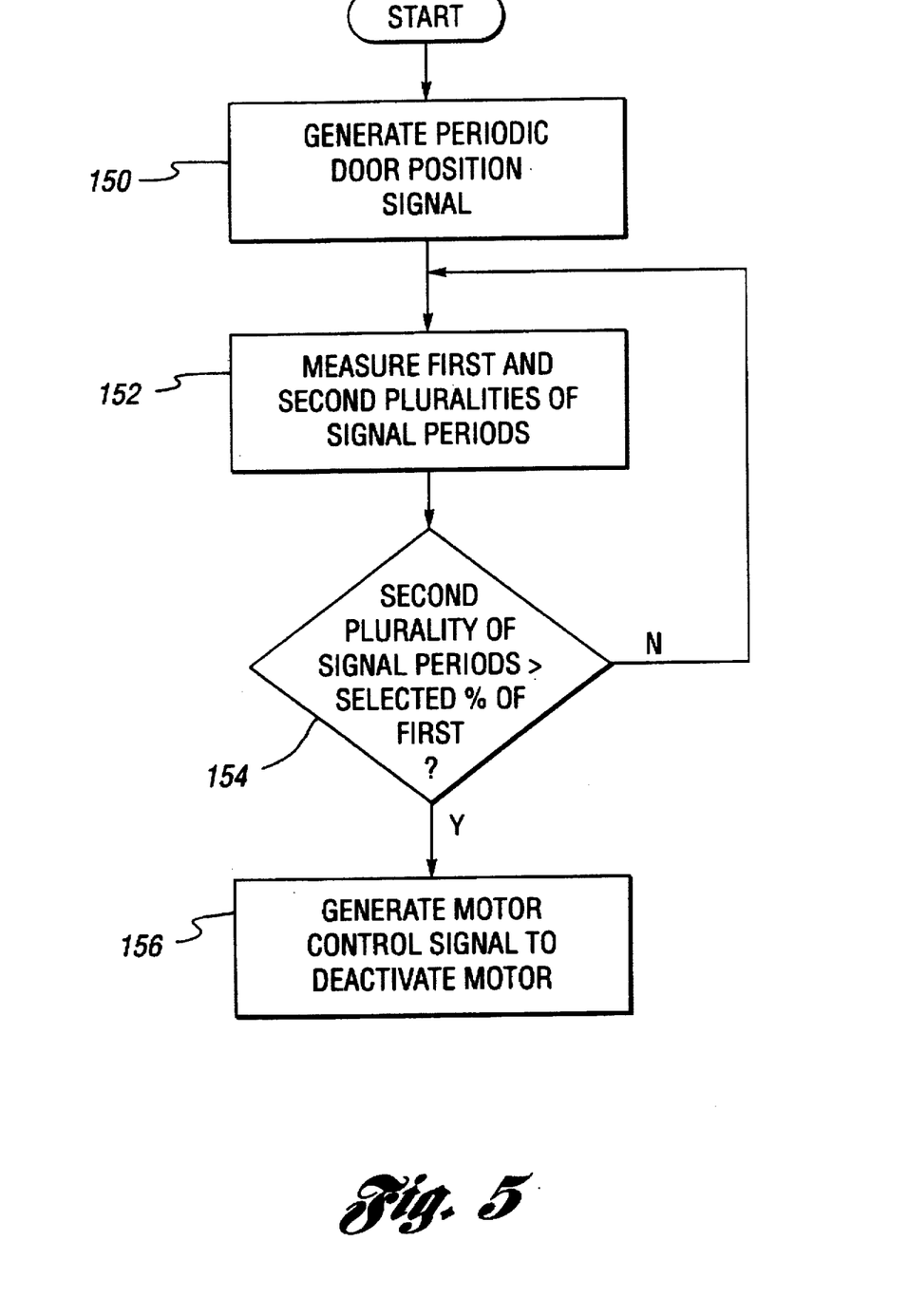
FIG. 5 is a flowchart concerning blockage detection for the vehicle sliding door according to the control system and method of the present invention.

Referring finally to FIG. 5, a flowchart concerning blockage detection for the vehicle sliding door according to the control system (10) and method of the present invention is shown. As seen therein, and with continuing reference to FIG. 1, obstacle detection is generally accomplished by determining the position and movement of door (36) via position encoder (18) and the control algorithm in control module (28).

While obstacle detection takes place during both opening and closing operations, it is delayed a selected period at the start of each such operation. This allows door (36) to clear its secondary and cinch positions. Control module (28) learns the motion characteristics of the door system as described above and detects an obstacle when the feedback from position encoder (18) is not characteristic of the door system. When an obstacle has been detected, the drive motor (30) is immediately disabled and subsequently reversed.

Referring again to FIGS. 1 and 5, obstacle detect begins with the generation (150) of a periodic signal via position encoder (18) that represent door position. Thereafter, a first plurality of signal periods and a second plurality of signal periods are measured (152) in the manner described below such that errors in the periodic signal are minimized. Thereafter, the first and second pluralities of signal periods are compared (154) to determine if the second plurality of signal periods exceeds a selected percentage of the first plurality of signal periods. If so, this is an indication of blockage and a motor control signal operative to deactivate the motor is generated (156). If not, a first plurality of signal periods and a second plurality of signal periods are again measured (152) and compared (154).

More particularly, during a door closing operation, between a first selected door position (preferably 200 mm from fully closed) and a second selected door position (preferably 25 mm from fully closed), a buffer sample consisting of the latest 16 pulsed inputs from position encoder (18) is compared to a buffer sample consisting of the latest 4 pulsed inputs. For comparison purposes, one buffer is scaled relative to the other. If the interval of the sample size exceeds a selected percentage of the interval of the 16 sample size (for example 105%), the system (10) and method of the present invention determine that door movement has been blocked by an obstacle and drive motor (30) is disabled and subsequently reversed.

In this region, the maximum force imparted by drive motor (36) to door (30) and by door (30) to an obstruction is preferably limited to 100 Newtons (N), allowing for approximately 5 mm of compression when measured with a spring constant of approximately 20 N/mm. By employing such 16 and 4 sample size rolling buffers, the system (10) and method of the present invention compare continuously updated "historical" and "instantaneous" representations of door speed, thereby continuously adapting to signal variations due to changing environmental and vehicle conditions previously described.

Between a second selected door position (preferably 25 mm from fully closed) and a third selected door position (preferably 4 mm from fully closed), a buffer sample consisting of the latest 4 pulsed inputs from position encoder (18) inside the second selected position is compared to a buffer sample consisting of the last 4 pulsed inputs from position encoder (18) just before the second selected position. Adjusting for the change in door speed, if the interval of the latest 4 sample size exceeds a selected percentage of the interval of last 4 sample size (for example 105%), the system (10) and method of the present invention determine that door movement has been blocked by an obstacle and drive motor (30) is disabled.

In this region, the maximum force imparted by drive motor (36) to door (30) and by door (30) to an obstruction is again preferably limited to 100 N, thereby allowing for approximately 1.5 mm of compression when measured with a spring constant of approximately 65 N/mm. In such a fashion, the system (10) and method provide for more sensitive blockage detection inside the second selected door position.

Finally, after the third selected door position (preferably 4 mm from fully closed), the system (10) and method of the present invention employs no obstacle detect feature, except that associated with expiration of the general timeout period previously described. It should also be noted that the general timeout period may also be used at any door position as a redundant or backup form of blockage detection. In that regard, upon expiration of the general timeout period for any reason (such as door jam, drive motor failure, cable failure, or position encoder failure), the system (10) and method disable drive motor (30).

As previously mentioned, obstacle detection during door opening operations preferably takes place in a similar fashion to obstacle detection during door closing operations. During door closing operations, however, the first, second and third selected door positions are substantially closer to the fully open door position.

As is readily apparent from the foregoing description, the present invention provides an improved system (10) and method for controlling a vehicle sliding door. More particularly, the system (10) and method limit and adjust door closing force in discrete steps by controlling average motor current based on previous run data. The system (10) and method also eliminate systematic quadrature signal errors resulting from tolerances of the components generating the signal, thereby nulling the affects of wear, temperature, and varying battery voltage and providing reliable door travel information.

The system (10) and method further provide high sensitivity blockage detection that minimizes the force applied to an object which inadvertently blocks the closing of the door. The system (10) and method still further provide for automatic door operations that are tolerant to perturbations normally experienced. The system (10) and method also provide an audible tone during automatic door operations, including increasing tone intensity as the door nears its closed position, thereby alert passengers and others to such door operations. Finally, the system (10) and method provide for mechanical operation, including in the event of a loss of signal integrity or uncertainty of control.

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

What is claimed is:

1. A method for controlling a vehicle sliding door driven by an electric motor powered by a battery, the method comprising:

generating a motor control signal operative to activate the motor such that motor imparts a first selected force to the door and moves the door;

generating a plurality of signal pulses in response to movement of the door;

processing the plurality of signal pulses to determine a door speed and a door position;

generating a motor control signal at a selected door position operative to activate the motor such that the motor imparts a second selected force to the door, the motor control signal being based on the door speed;

counting a first set of the plurality of signal pulses, the first set having a first time period associated therewith;

counting a second set of the plurality of signal pulses, the second set having a second time period associated therewith;

comparing the first time period to the second time period; and generating a motor control signal operative to deactivate the motor when the second time period exceeds a selected percentage of the first time period.

2. The method of claim 1 wherein the second set of the plurality of signal pulses has a number of signal pulses equal to four times that of the first set.

3. The method of claim 1 wherein the first set of signal pulses and the second set of signal pulses include a common set of signal pulses.

4. The method of claim 1 wherein the first set of signal pulses and the second set of signal pulses are rolling samples.

5. The method of claim 1 further comprising generating an audible tone as the door moves, the tone having a first quality as the door moves toward a fully closed position and the door position exceeds a selected position, and a second quality as the door moves toward the fully closed position and the door position is less than the selected position.

6. The method of claim 1 further comprising:

generating a motor control signal operative to deactivate the motor when the door reaches a fully closed position;

setting a counter equal to zero when the door reaches the fully closed position;

detecting motor stall when the door moves toward a fully open position, the first time period fails to exceed the selected percentage of the second time period, and the door speed is zero;

determining a fully open door position when a motor stall is detected; and generating a motor control signal operative to deactivate the motor when the door reaches the fully open position.

7. The method of claim 1 wherein the motor control signal operative to activate the motor such that the motor imparts a second selected force to the door is further based on a voltage of the battery.

8. The method of claim 1 wherein the first set of signal pulses is counted before the door reaches the selected position and the second set of signal pulses is counted after the door reaches the selected position.

9. A system for controlling a vehicle sliding door driven by an electric motor powered by a battery, the system comprising:

means for generating a motor control signal operative to activate the motor such that motor imparts a first selected force to the door and moves the door;

means for generating a plurality of signal pulses in response to movement of the door;

means for processing the plurality of signal pulses to determine a door speed and a door position;

means for generating a motor control signal at a selected door position operative to activate the motor such that the motor imparts a second selected force to the door, the motor control signal being based on the door speed;

means for counting a first set of the plurality of signal pulses, the first set having a first time period associated therewith;

means for counting a second set of the plurality of signal pulses, the second set having a second time period associated therewith;

means for comparing the first time period to the second time period; and means for generating a motor control signal operative to deactivate the motor when the first time period exceeds a selected percentage of the second time period.

10. The system of claim 9 wherein the second set of the plurality of signal pulses has a number of signal pulses equal to four times that of the first set.

11. The system of claim 9 wherein the first set of signal pulses and the second set of signal pulses include a common set of signal pulses.

12. The system of claim 9 wherein the first set of signal pulses and the second set of signal pulses are rolling samples.

13. The system of claim 9 further comprising means for generating an audible tone as the door moves, the tone having a first quality as the door moves toward a fully closed position and the door position exceeds a selected position, and a second quality as the door moves toward the fully closed position and the door position is less than the selected position.

14. The system of claim 9 further comprising:

means for generating a motor control signal operative to deactivate the motor when the door reaches fully closed position;

means for setting a counter equal to zero when the door reaches fully closed position;

means for detecting motor stall when the door moves toward a fully open position, the first time period fails to exceed the selected percentage of the second time period, and the door speed is zero;

means for determining a fully open door position when a motor stall is detected; and means for generating a motor control signal operative to deactivate the motor when the door reaches the fully open position.

15. The system of claim 9 wherein the motor control signal operative to activate the motor such that the motor imparts a second selected force to the door is further based on a voltage of the battery.

16. The system of claim 9 wherein the first set of signal pulses is counted before the door reaches the selected position and the second set of signal pulses is counted after the door reaches the selected position.

* * * * *